Dec. 17, 1929.  E. M. CROSLAND  1,739,504
BISCUIT MAKING MACHINERY
Filed Jan. 18, 1927
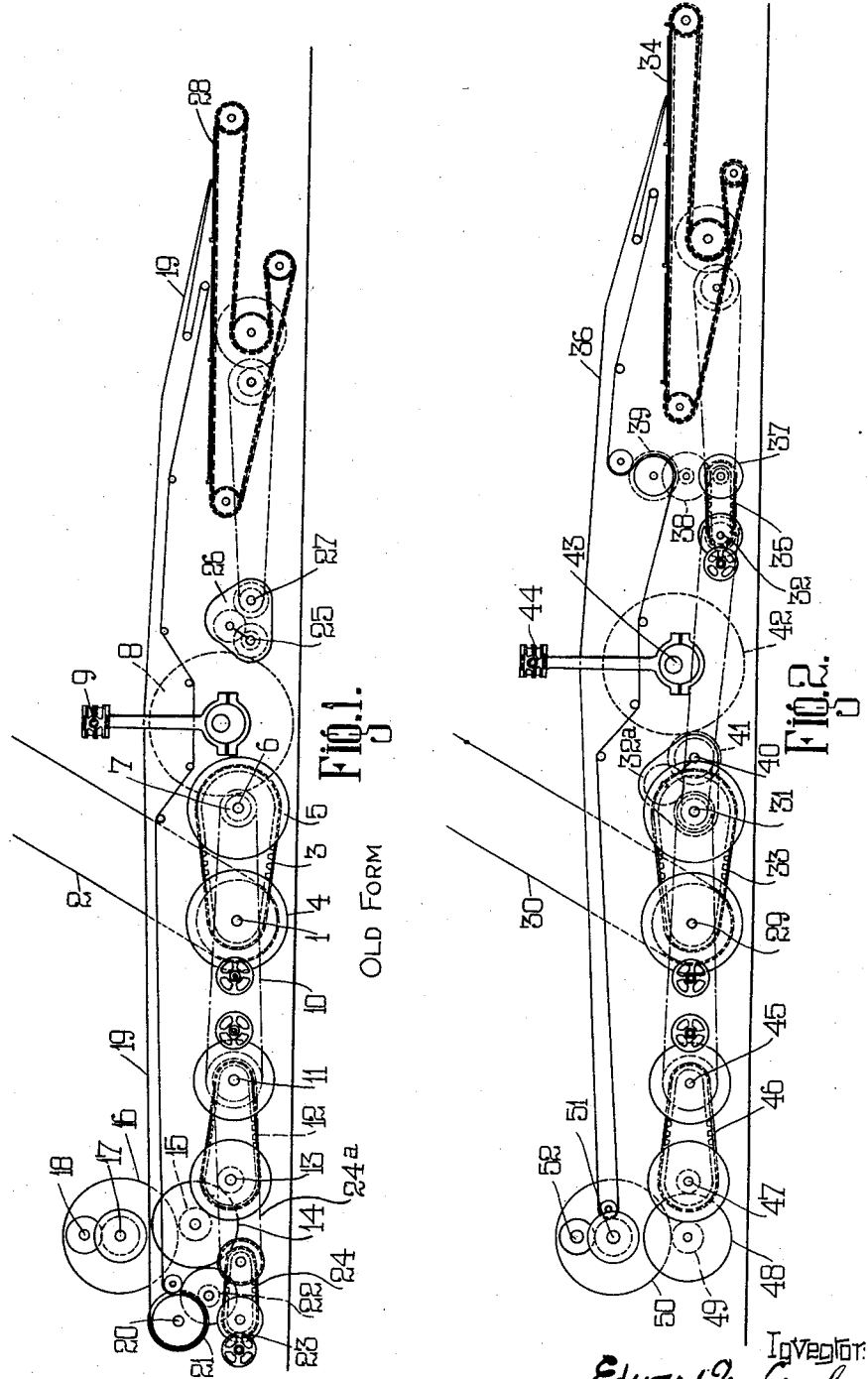

Patented Dec. 17, 1929

1,739,504

UNITED STATES PATENT OFFICE

EDWARD MILNER CROSLAND, OF NEWTON-LE-WILLOWS, ENGLAND

BISCUIT-MAKING MACHINERY

Application filed January 18, 1927, Serial No. 161,773, and in Great Britain February 1, 1926.

The present invention relates to biscuit making machinery, and more particularly to that type of machine known as the continuous cutting machine; that is to say, a machine in which the cutters and the embossing tools move forward with the dough on the cutting web while actually operating on such dough, thereby rendering unnecessary any stoppage of the cutting web while the cutters or embossing tools are operating on the dough.

Such a machine in general comprises apparatus for rolling or gauging the dough to the required thickness, impressing the dough with the desired biscuit pattern, cutting out the biscuit shape, separating the biscuit from the scrap dough, and delivering the cut out biscuits in regular formation onto suitable pans or trays ready for the baking process.

In order to ensure the successful working of the complete apparatus certain speed ratios of the various parts are essential. The gauging rollers must be rotating at a suitable speed to give the correct dough delivery to the cutting web; the cutting web must be moving at a certain rate so that the biscuits cut out are suitably spaced row by row. The cutter cross head must move at such a rate that the speed whilst cutting, exactly coincides with the speed of travel of the dough. The correct number of rows of biscuits must be delivered properly spaced to each pan. The important part of the machine is that the number of strokes of the cutter cross head and the forward travel of the pan must be mechanically definite. The gearing must be positive as otherwise any very slight error would be accumulative and the biscuits in consequence would lose their definite formation on the pans.

In past practice it has been usual to provide a gear box for altering the number of biscuits per pan when it has been desired to change the size of the biscuits to be baked and this gear box has been placed between the cutter cross head gearing and the pan feed gearing, with the consequential result that a considerable number of adjustments have had to be made to the various movable elements before the cutting cross head and the panning mechanism worked in complete synchronization. For example in a continuous cutting machine running at $2x$ strokes of the cutter cross head to one length of pan, in order to bake a biscuit of larger size involving $x$ strokes of the cutter cross head per pan of biscuits, and allowing the number of pans delivered to the oven per minute to remain constant, it is necessary first of all to change the gear in the gear box from $2x$ to $x$. It is then necessary to alter the main variable gear of the machine so as to reduce the speed by half, as owing to the change in the gear box the pans have doubled their speed. It will now be seen that having reduced the speed of the whole machine the cutting web is travelling at half the necessary speed and the variable gear driving the cutting web has to be altered so as to bring the cutting web and gauging rollers up to approximately double their speed. Lastly it is necessary to alter the horizontal stroke of the cutter cross head so as to synchronize the whole machine.

According to the present invention the cutter cross head is actuated through a gear box situated between the main drive of the machine and the cross head, thereby allowing the speed of the cutter cross head to be altered without changing the speed of the pans and at the same time maintaining an exact mechanical ratio of speed between the cutter cross head and the pans.

By this construction in the event of any desired alteration in the size of biscuits involving an adjustment to insure $x$ cuts of biscuits per pan from $2x$ cuts of biscuits, the only alteration entailed is that of the cutter cross head gear and the length of horizontal stroke of the cutter cross head.

The invention is more particularly described with reference to the accompanying drawings in which:—

Figure 1 shows diagrammatically the usual arrangement as applied to biscuit making machines.

Figure 2 shows an arrangement according to the present invention.

In the usual machines the main driving shaft 1 driven by belt or the like means 2 drives by means of a variable speed gear, such as belt and expanding pulleys 3, 4, 5, a shaft 6 which has a pinion 7 on it meshing with a pinion 8 driving the cutter cross head 9. This shaft 6 also drives by means of chain or the like gearing 10 a pulley on the shaft 11 of a belt and expanding pulley variable speed gear 12, the driven shaft 13 of which meshes with a gear wheel 14 driving through wheels 15, 16, the shafts 17 and 18 of dough rollers, which feed a web of adjustable thickness to the web conveyor 19, which passes over a driving pulley on the shaft 20, and is driven through gears 21, 22, 23 from a belt and expanding pulley variable speed gearing 24 which in turn is driven by a chain or the like 24ª operated from the shaft 11.

A toothed wheel 8 also drives the driving shaft 25 of a selector gear transmission box 26 giving a number of variable set predetermined speeds of drive to a driving shaft 27 driving a panning conveyor 28 for the oven.

Now it will follow from this construction that supposing the cutter operated by the cross head 9 is cutting eight rows of biscuits fed by the fripping conveyor 19 per pan on the panning conveyor 28 to the oven, then the drive in the gear box 26 must be so adjusted that the gear wheel 8 rotates eight revolutions, whilst one pan on the conveyor 28 passes under the delivery end of the conveyor 19. During the time the wheel 8 makes 8 revolutions the cutting web 19 will move approximately a distance equal to the length of one of the pans on the conveyor 28. Assuming a pan of twenty-six inches length on which the biscuits would be spaced over a distance of twenty-four inches then the travel of the cutting web 19 will be approximately twenty-four inches. This travel is obtained by suitable adjustment of the variable speed gear 24.

Now in cutting machine of this description with a continuously moving cutting web, it is essential that the cutting table and the cutters will move at a speed which will synchronize with the speed of the cutting web 19, so that when the cutters come into contact with the dough, the cutters and the table are equal in speed to the web carrying the dough. When these movements are equal the rollers on the spindle 17, 18 are adjusted to deliver the desired amount of dough to the cutting web, and then the speed of the whole machine can be increased by altering the speed of drive by means of the variable speed gear 3, 4, 5.

Supposing now however, it is desired to alter the machine to suit a different class of biscuit in which only four rows of biscuits are placed on each pan, whilst however, ten pans per minute are required for the oven, then it will be necessary to change the ratio of speed in the gear box 26 which automatically doubles the speed of the panning mechanism, leaving the revolutions of the wheel 8 the same, that is to say, eighty cuts per minute upon 240 inches of dough per minute, from which it follows that although the cuts per minute relative to the travel of the pans are correct, the panning speed is double the required amount and only half the required amount of dough consistent with such increased speed of the pans is being fed.

Now as ten pans per minute are required it will be necessary to reduce the cutting speed to 40 revolutions or cuts by adjusting the variable speed gearing 3, 4, 5. This will also give the required ten pans per minute, but in doing this the gauge rollers 17, 18 and also the web 19 have been reduced, viz, to 120 inches per minute delivery, and therefore, it is now necessary to adjust the speed of the web 19 to synchronize with the cutters and this is done by adjusting the variable speed gear 22, 23, 24 to approximately double the speed and subsequently to adjust the variable speed gear 11, 12, 13 to increase the gauge roller deliverer 17, 18.

It will consequently be seen that in order to effect any alteration in the number of rows of biscuits per pan several adjustments are necessary.

This is however, avoided by the arrangement of the present invention as shown by way of example in Figure 2, in which the cutting mechanism instead of being driven directly from the main drive is operated from the driven shaft of the gear box, whilst the panning conveyor is driven directly from the main shaft.

In this arrangement the main driving shaft 29 of the machine driven similarly by belt or the like gearing 30, drives the driving shaft 31 of a gear box 32ª through an expanding pulley and belt variable speed gear 33. This shaft 31 driven directly from the driving shaft 29 drives the driving shaft 32 for the panning conveyor 34, and this shaft is also the driving shaft for a variable speed gear 35 driving the cutting conveyor web 36 through gearing 37, 38, 39. The driven shaft 40 of the gear box which can be driven at any one of a set number of predetermined speeds, drives through gear wheels 41, 42 the shaft 43 oscillating the cutter head 44.

The driving shaft 31 also drives directly a driving shaft 45 of a belt and expanding pulley variable speed gear 46, the driven shaft 47 of which drives through gearing 48, 49, 50 the dough delivery rolls 51, 52.

It will consequently now be immediately appreciated that whilst the setting of the machine in the first instance will be similar to that of normal machines, as shown in Figure 1, yet the only change necessary when altering the number of rows of biscuits per pan is a change of set speed of the gear box 32ª.

Suppose by way of example, that the machine is set to cut eight rows of biscuits per pan whilst the conveyor delivers ten pans of cut biscuits per minute to the oven, then the cutter 44 will be reciprocated eighty times per minute, whilst the cutting web will deliver 240 inches of dough per minute. Should however, it be desired to alter the machine to a type of biscuit in which four rows of biscuits only per pan are necessary, then the only change will be to alter the speed of transmission in the selector gear box $32^a$ without interfering either with the speed of the pan 34, or with the speed of the dough rollers 51, 52, or further with the conveyor web 36, the speeds of which remain constant.

I declare that what I claim is:—

1. A biscuit making machine including in combination a constant speed main driving shaft, a variable speed transmission gearing driven from said shaft, biscuit forming mechanism driven from said variable speed transmission gearing, a panning conveyor, dough delivery rolls, and means to drive said panning conveyor and dough delivery rolls direct from said main driving shaft independently of said variable speed transmission gearing, and variable speed transmission gearings between said main shaft and dough delivery rolls.

2. A biscuit making machine including in combination a constant speed main driving shaft, a variable speed transmission gearing driven from said shaft, biscuit forming mechanism driven from said variable speed transmission gearing, dough forming and conveying devices and means to independently drive said devices from said main driving shaft, a master driving shaft and variable speed gearing between said master driving shaft and the main machine driving shaft.

3. A biscuit making machine including in combination a constant speed main driving shaft, main variable speed transmission gearing driven from said main shaft, a first variable speed transmission gearing driven from said main gearing, dough delivery rolls operated by said first gearing, a second variable speed transmission gearing driven from said main gearing, dough cutting mechanism operated from said second gearing, a third variable speed transmission gearing driven from said main gearing, a cutting conveyor operated by said third gearing and adapted to move the dough from said rolls past said cutting mechanism, and a panning conveyor driven from said main gearing and adapted to receive the cut biscuit from said cutting conveyor.

In witness whereof, I have hereunto signed my name this 5th day of January, 1927.

EDWARD MILNER CROSLAND.